(12) United States Patent
van Boxtel

(10) Patent No.: US 12,049,166 B2
(45) Date of Patent: Jul. 30, 2024

(54) OPEN ROOF CONSTRUCTION FOR A VEHICLE

(71) Applicant: INALFA ROOF SYSTEMS GROUP B.V., Oostrum (NL)

(72) Inventor: Eduardus Christianus Henricus van Boxtel, Zeeland (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/487,998

(22) Filed: Sep. 28, 2021

(65) Prior Publication Data

US 2022/0097502 A1 Mar. 31, 2022

(30) Foreign Application Priority Data

Sep. 30, 2020 (EP) ..................................... 20199152

(51) Int. Cl.
| | |
|---|---|
| B60J 7/043 | (2006.01) |
| B60Q 3/208 | (2017.01) |
| B60Q 3/64 | (2017.01) |
| B60Q 3/66 | (2017.01) |

(52) U.S. Cl.
CPC .............. B60Q 3/208 (2017.02); B60J 7/043 (2013.01); B60Q 3/64 (2017.02); B60Q 3/66 (2017.02)

(58) Field of Classification Search
CPC .......... B60J 7/043; B60J 7/0435; B60J 7/047; B60Q 3/208; B60Q 3/64; B60Q 3/66
USPC .............................. 296/216.02–216.5, 216.08
See application file for complete search history.

(56) References Cited

U.S. PATENT DOCUMENTS

| | | | | |
|---|---|---|---|---|
| 10,507,763 B2 * | 12/2019 | Park | ......................... | B60Q 3/57 |
| 10,625,668 B2 * | 4/2020 | Oshina | ..................... | B60Q 3/64 |
| 2010/0080010 A1 | 4/2010 | Marui et al. | | |
| 2019/0135170 A1 | 5/2019 | Salter et al. | | |

(Continued)

FOREIGN PATENT DOCUMENTS

| | | | |
|---|---|---|---|
| CN | 214215450 U | * | 9/2021 |
| DE | 10055561 A1 | | 5/2002 |
| DE | 102009038483 A1 | | 2/2011 |

(Continued)

OTHER PUBLICATIONS

European Search Report in corresponding European patent application No. 20199152.8 dated Mar. 29, 2021.

*Primary Examiner* — Dennis H Pedder
(74) *Attorney, Agent, or Firm* — Steven Koehler; Westman, Champlin & Koehler, P.A.

(57) ABSTRACT

An open roof construction for a vehicle comprises at least one at least semi-transparent panel for closing an opening in a fixed roof part of the vehicle. A retractable sunscreen device is capable of blocking daylight entering through the panel. The sunscreen device includes a sunscreen slidably guided in a pair of guide rails each extending below and along a longitudinal edge of the opening in a longitudinal direction. A light guiding device is attached to each of the guide rails, the light guiding device comprising at least a first light guide for guiding light from a light source to an interior space in the vehicle. The light guiding device on each of the guide rails comprises means to direct light at least in two different directions, one towards a central part of the sunscreen, the other towards an area between the respective guide rail and the panel.

20 Claims, 9 Drawing Sheets

(56) References Cited

U.S. PATENT DOCUMENTS

2019/0184895 A1 6/2019 Oshina
2020/0164727 A1 5/2020 Hiemstra et al.

FOREIGN PATENT DOCUMENTS

| | | |
|---|---|---|
| DE | 102011103319 A1 | 12/2011 |
| DE | 102015210977 A1 | 12/2016 |
| DE | 102016101873 A1 | 8/2017 |
| DE | 102017202924 A1 | 8/2018 |
| DE | 202017106805 U1 | 2/2019 |
| DE | 202018106291 U1 | 2/2019 |
| EP | 2287042 A1 | 2/2011 |
| EP | 2454110 B1 | 6/2013 |
| FR | 2886238 A1 | 12/2006 |
| JP | H03100540 U | 10/1991 |
| JP | 2014088075 A | 5/2014 |
| JP | 2017043225 A | 3/2017 |
| WO | 2018/206600 A1 | 11/2018 |

\* cited by examiner

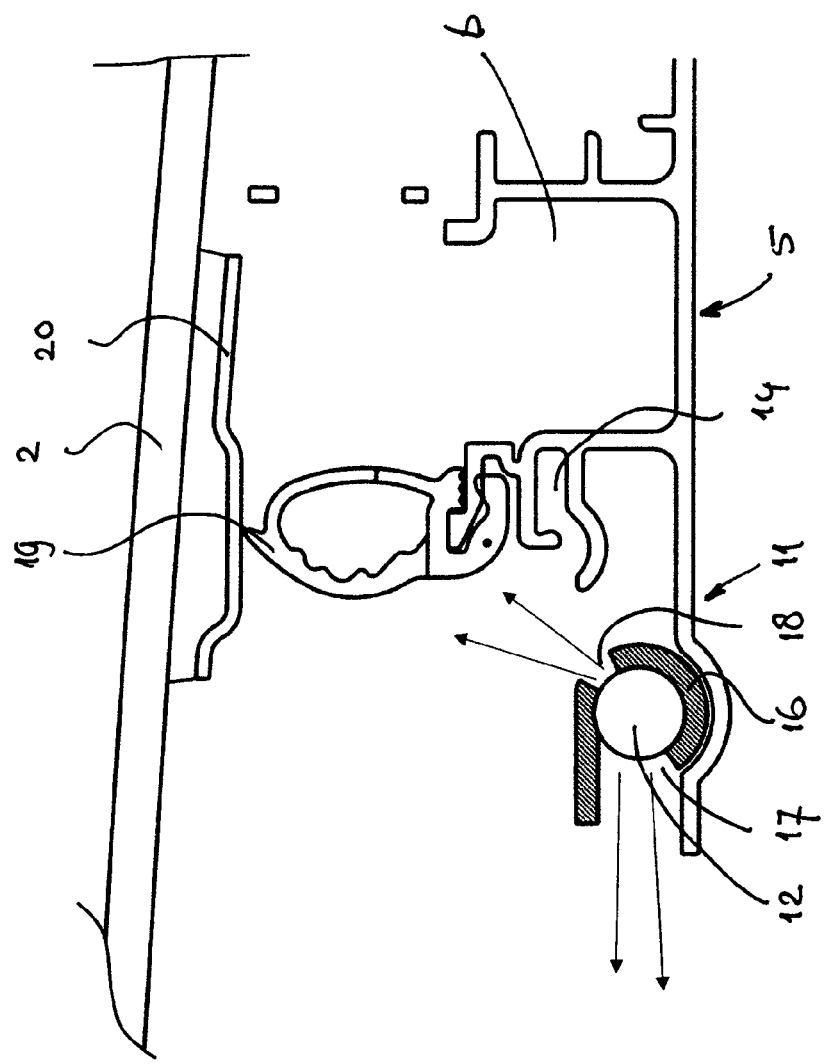

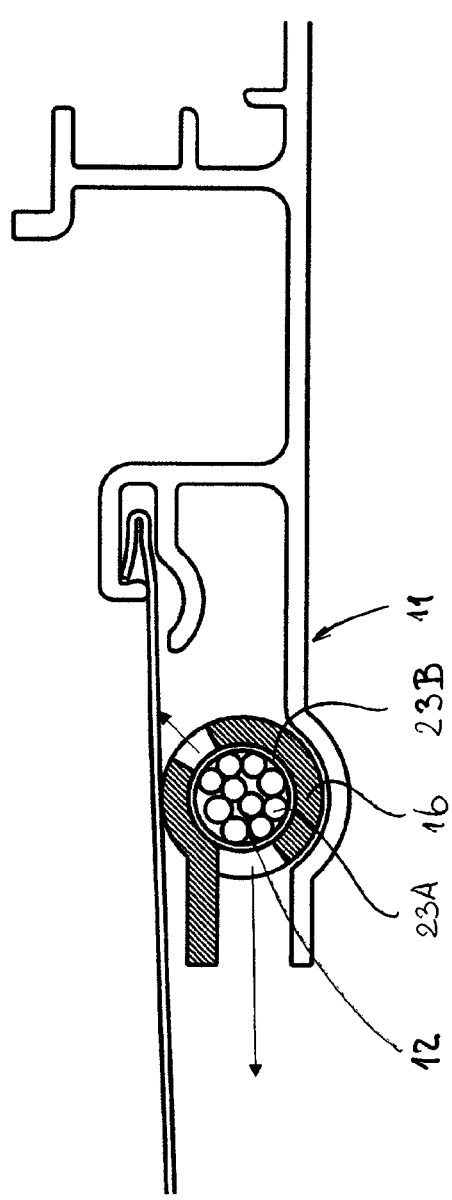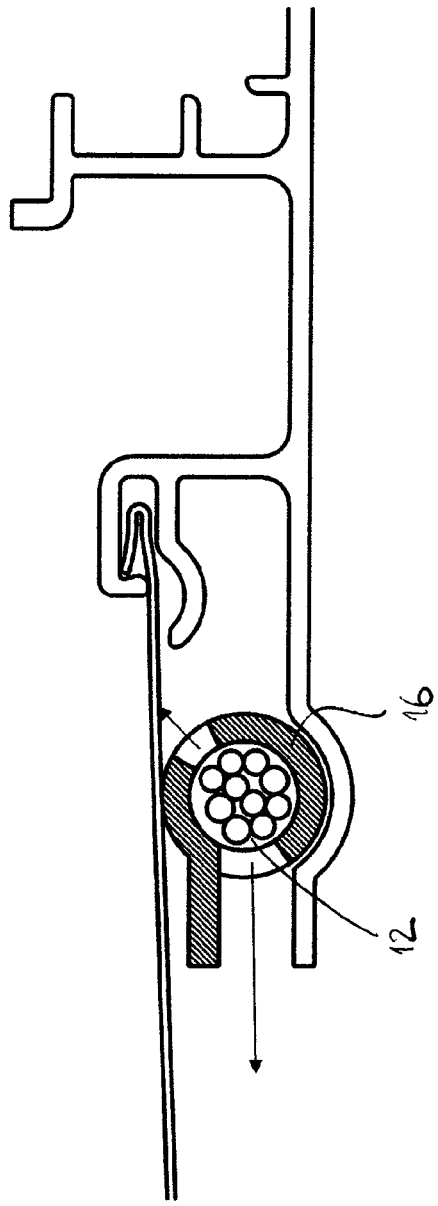

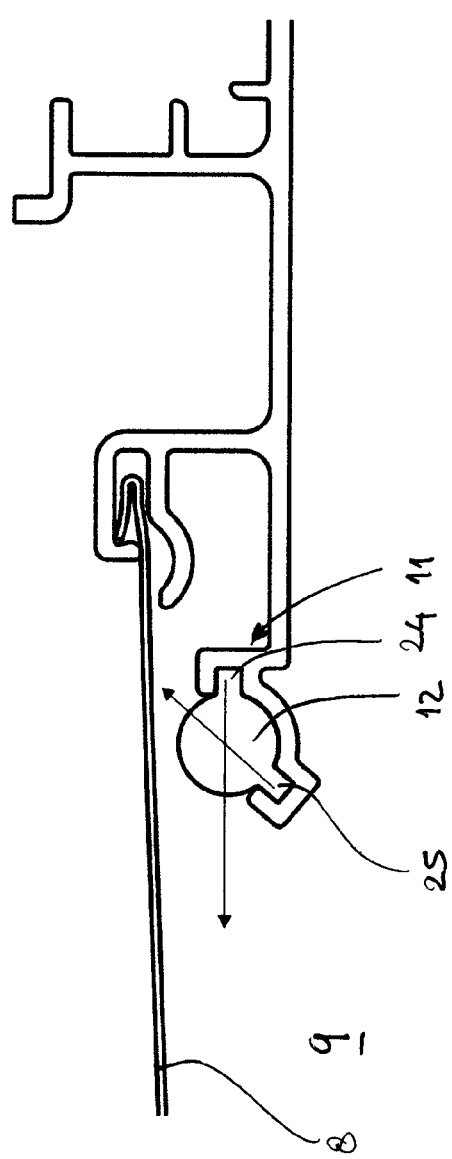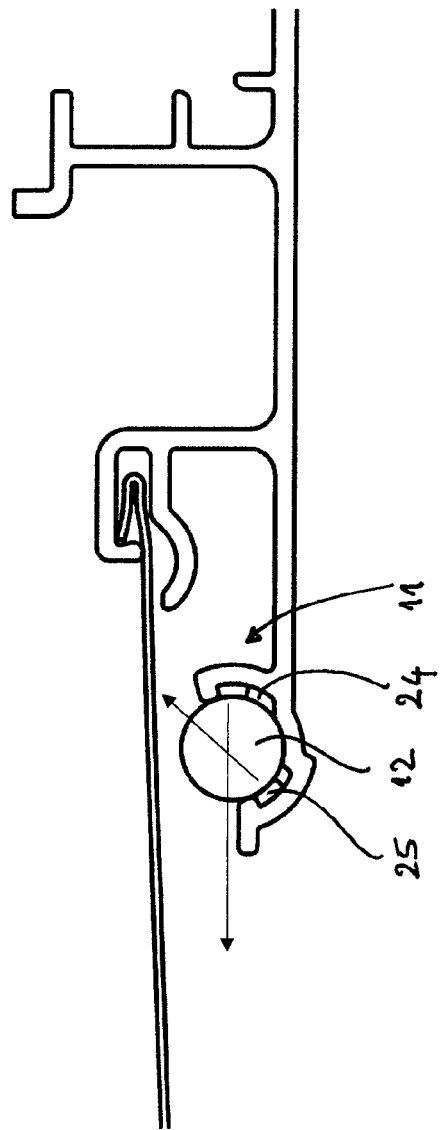

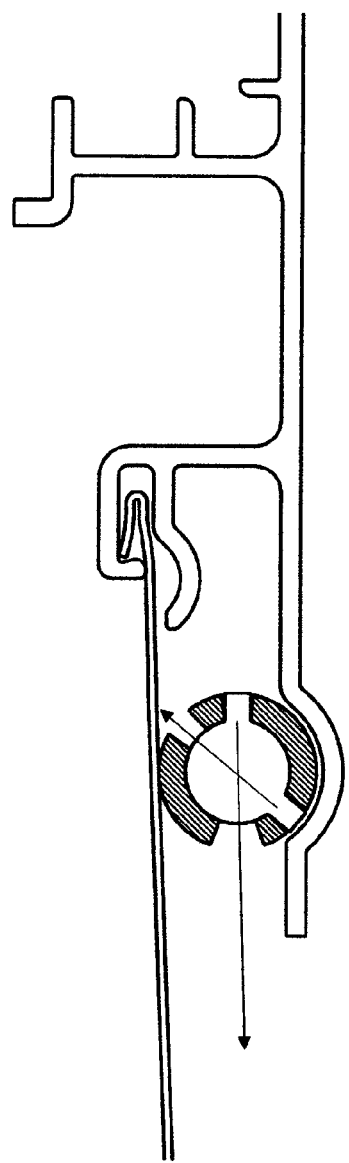
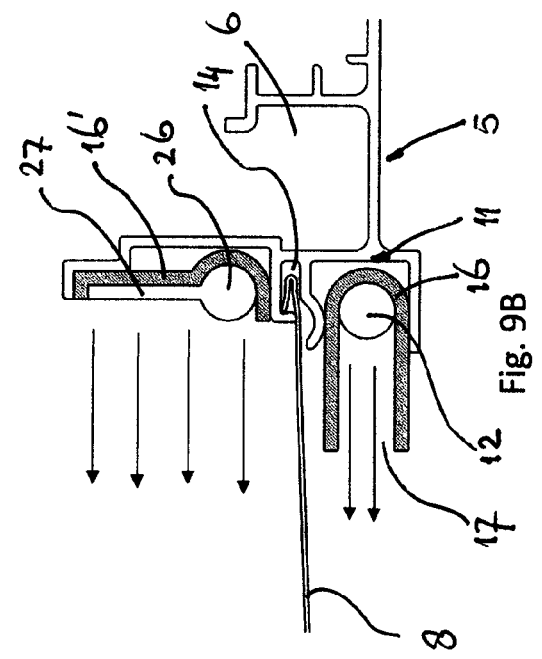
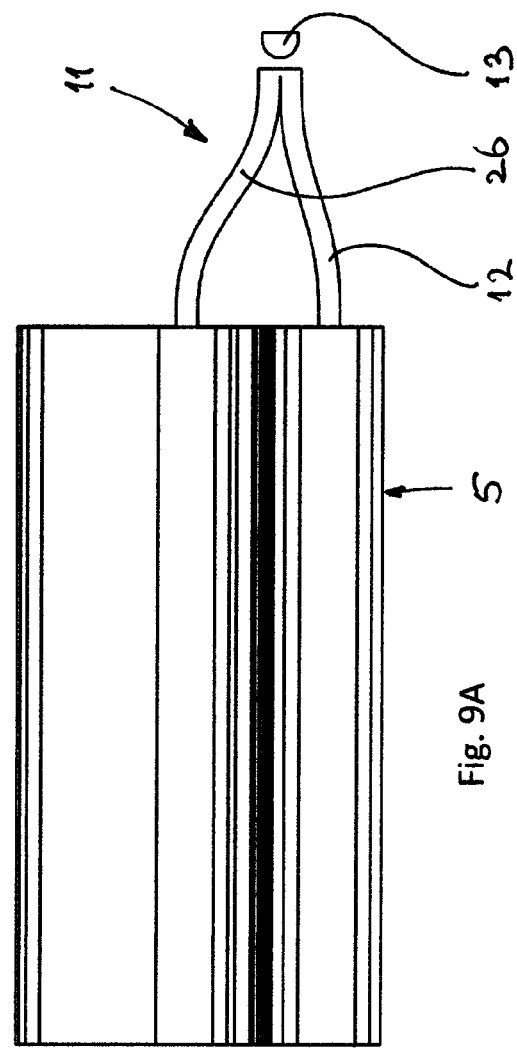
Fig. 8
Fig. 9A
Fig. 9B

OPEN ROOF CONSTRUCTION FOR A VEHICLE

BACKGROUND

The discussion below is merely provided for general background information and is not intended to be used as an aid in determining the scope of the claimed subject matter.

In a known open roof construction for a vehicle a light guide is located in a guide rail for a sunscreen device. The light guide fits into a cavity of the guide rail and emits light into a narrow gap towards the part of the sunscreen device which is visible for the occupants in the interior of the vehicle.

This prior art lighting device works well when the sunscreen is closed and thus the lower side of the sunscreen is illuminated, it does not give satisfying results if the sunscreen is opened.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction for a vehicle comprises at least one at least semi-transparent panel for closing an opening in a fixed roof part of the vehicle. A retractable sunscreen device is capable of blocking daylight entering through the panel. The sunscreen device includes a sunscreen slidably guided in a pair of guide rails each extending below and along a longitudinal edge of the opening in a longitudinal direction. A light guiding device is attached to each of the guide rails, the light guiding device comprising at least a first light guide for guiding light from a light source to an interior space in the vehicle. The light guiding device on each of the guide rails directs light at least in two different directions, one towards a central part of the sunscreen, the other towards an area between the respective guide rail and the panel. One direction will result in an illumination of the closed sunscreen, the other direction will provide an (indirect) illumination of the interior when the sunscreen is opened. The light will preferably be directed such that the panel of the open roof construction is never illuminated directly from below to prevent reflection of light in the panel when the sunscreen is open.

In one embodiment, the first light guide comprises means to direct light in two different directions.

This is the simplest solution since only one light guided is needed for the two lighting modes.

One of the possibilities to direct light in two directions is to use means that include a non-transparent shield partly surrounding the first light guide.

In this way, the shield can be used to block light in all but two (or more if desired) directions.

The shield may include transparent windows at the positions where light must be directed out of the first light guide to allow maintaining an integral shield, but at least one of the windows of the shield may be open to be able to use this opening to introduce the light guide into the shield in a direction perpendicularly to it, in particular if the shield is a part clamped around the first light guide.

In another embodiment, the shield is co-extruded with the first light guide, which simplifies the assembly.

Instead of or in addition to the shield, the means may include light directing members on the outer circumference of the first light guide directing light out of the first light guide at a position opposite to the light directing members.

The light directing members may include at least one of a prism, or a light reflecting print or co-extrusion on the circumference of the first light guide.

To further block light the shield of each light guiding device may include a projecting part above the window directing light towards a central part of the sunscreen. Such projecting part may be used to prevent light coming from the light guide to reflect on the transparent panel, typically made from glass or plastic.

In a particular embodiment, the light guiding device includes a second light guide directing light to an upright cover covering at least a part of the area between the respective guide rail and the panel.

Although such cover may also be used in the embodiment with only the first light guide, one can create more special effects if a separate second light guide is used, for example with an integrated cover, for example formed by a part of the shield. The second light guide itself may also be provided with an upright projection directing light from the second light guide directly to the interior. Such second light guide will generally be positioned above the level of the sunscreen.

In order to attach the first and/or second light guide to a stationary part of the open roof construction, it may include an attachment to attach the shield to the guide rail. To further integrate the shield with the guide rail, a part of the shield may form a sliding surface for the sunscreen.

The first and/or second light guide may be either a solid core or a bundle of light guiding fibres surrounded by a cladding.

BRIEF DESCRIPTION OF THE DRAWINGS

Hereinafter aspects of the invention will be elucidated while referring to the drawing.

FIGS. 4-8 each show a part of the schematic cross section of the guide rail as in FIGS. 3A-3B, but showing alternative embodiments of the light guiding device of FIGS. 3A-3B.

FIG. 9a is a side view of an end of the guide rail and light guiding device illustrating how a light source cooperates with the light guide.

FIGS. 9b, 10 and 11 also each show a part of the schematic cross section of the guide rail as in FIGS. 3A-3B, but showing alternative embodiments of the light guiding device of FIGS. 3A-3B.

DETAILED DESCRIPTION OF THE ILLUSTRATIVE EMBODIMENTS

Figure 1:
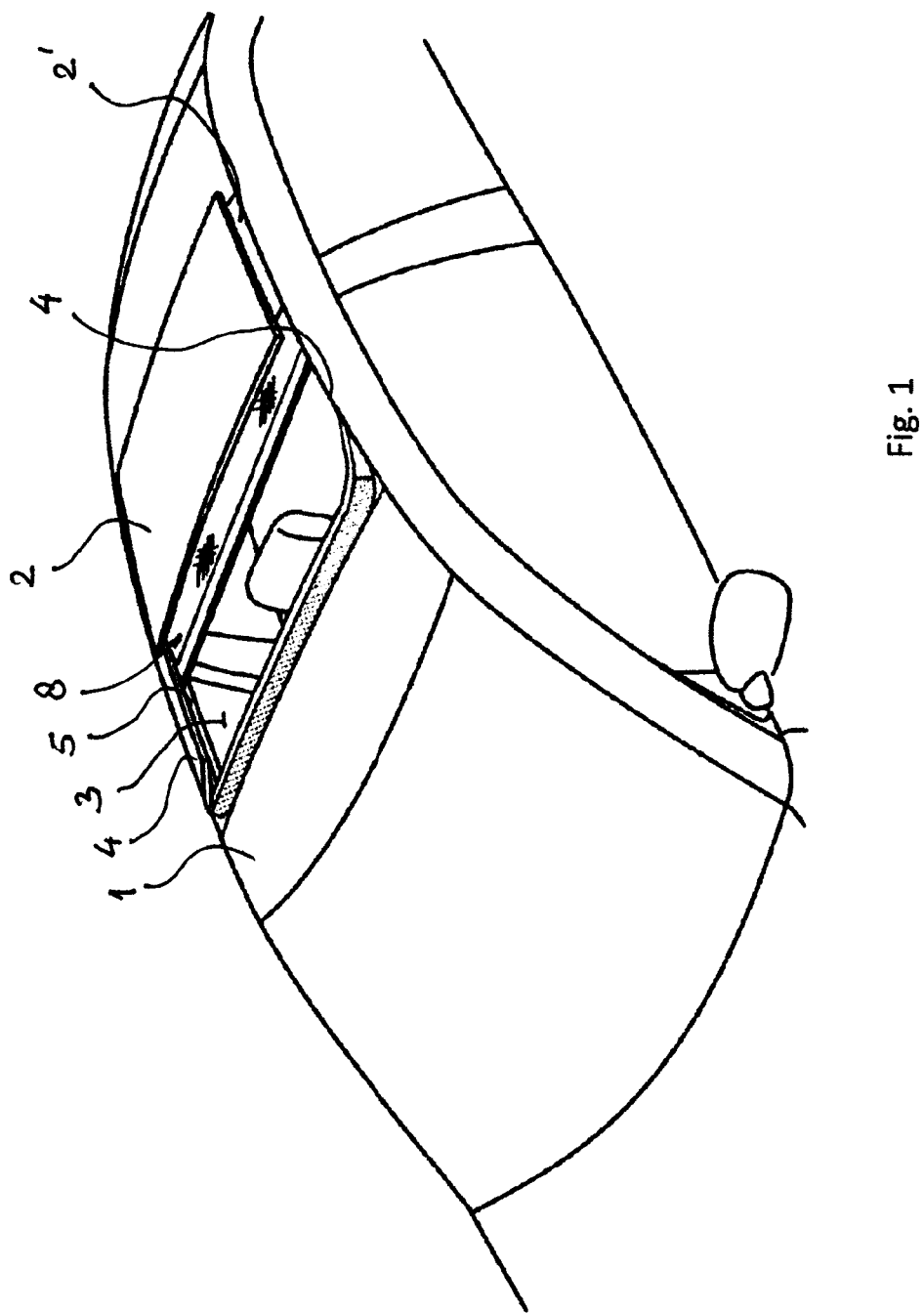
FIG. 1 illustrates in a perspective view part of a vehicle with the open roof construction in the fixed roof of the vehicle.

FIG. 1 shows a part of vehicle, in this case a passenger car, comprising an open roof construction in its fixed roof 1. The open roof construction comprises a transparent or semi-transparent panel 2 (or a panel with variable transparency) which is able to close or at least partly open a roof opening 3 in fixed roof 1. The open roof construction further comprises along and below each (left and right) longitudinal edge 4 of roof opening 3 a guide rail 5. The panel 2 is slidably guided in an outer part 6 of guide rail 5 and is also movable in vertical direction in order to enable panel 2 to slide above or below fixed roof 1. Adjacent to, in this case behind, movable semi-transparent panel 2 there is arranged a second panel 2', this panel may be a fixed panel and may be semi-transparent like front panel 2. However it may be conceivable as well that second panel 2' is also a movable panel for instance it may be a tiltable panel.

The open roof construction further comprises a retractable sunscreen device 7, comprising a flexible cloth like sunscreen 8 or a rigid plate sunscreen both of which are retractable, such that in a retracted or open mode, light coming from the exterior side of the vehicle may enter an interior space 9 in the vehicle, and daylight is blocked when sunscreen device 7 is in an extended or a rolled out mode. The retractable sunscreen 8 is slidably guided in a pair of the guide rails 5.

Figure 2:
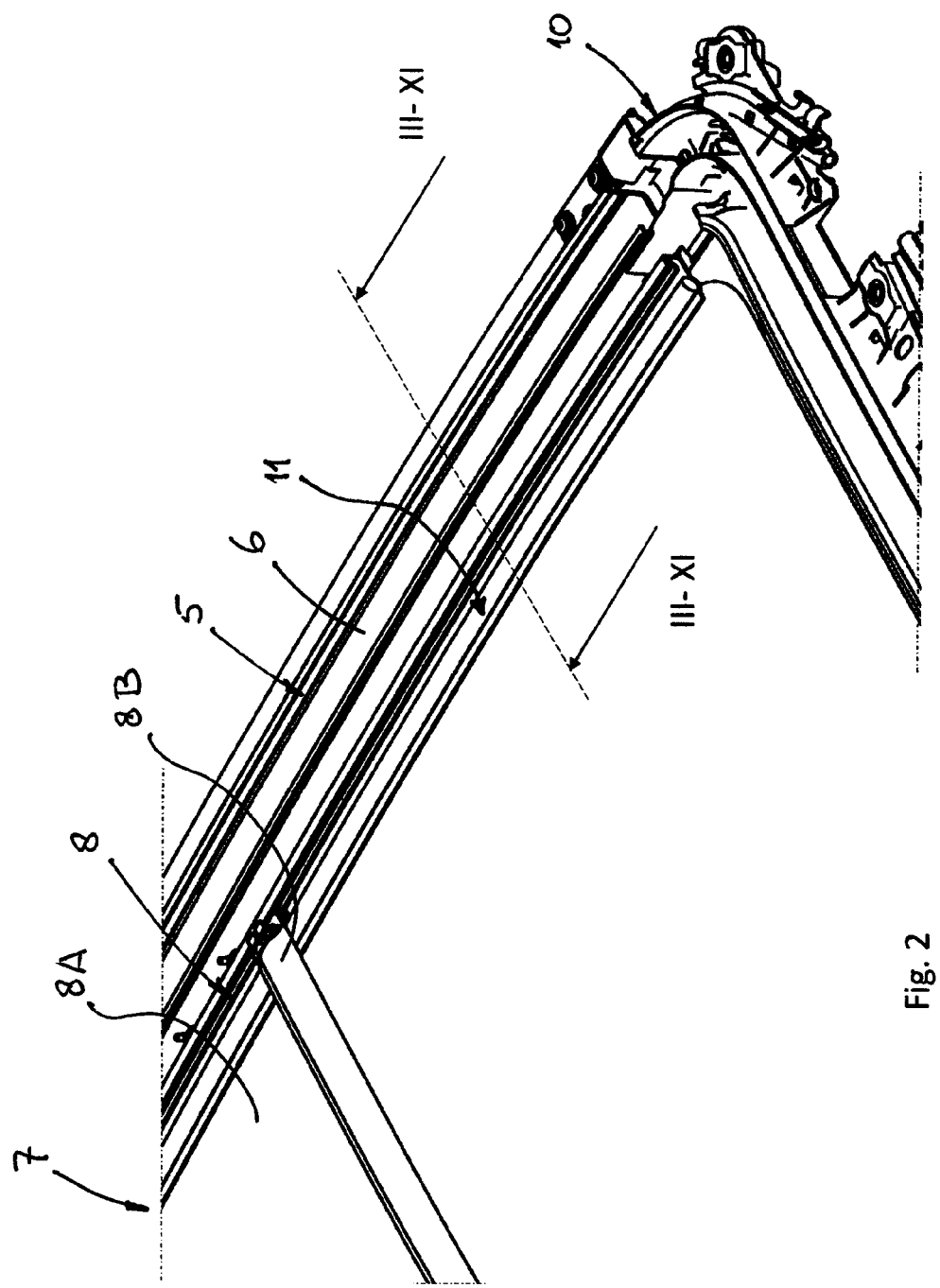
FIG. 2 schematically shows on a larger scale a front part of the open roof construction in perspective view, illustrating the position of the light guiding device in the open roof construction.

In FIG. 2 the open roof construction is shown partly whereby first and second panels 2, 2' are omitted for clarity and only a basic frame 10 of the open roof system is shown comprising one of guide rails 5. The retractable sunscreen 8 is shown as a rollo comprising a flexible cloth 8A and an operating beam 8B, the flexible cloth 8A being wound and unwound from a winding roller, not shown, but well known in the art. Below each of first and second panels 2, 2' there may be a light guiding device 11. The light guiding device 11 may be attached to guide rails 5 and may extend along the complete length of guide rails 5 or only for a part. In FIG. 2 it should be understood that two separate light guiding devices 11 are arranged at each left and right side of mirror-imaged guide rails 5, such that each of light guiding devices 11 extend over the length of a longitudinal edge of one or each of panels 2, 2'. Each light guiding device 11 comprises at least a first light guide 12 for guiding light from a light source 13 (FIG. 9) to interior space 9 in the vehicle. Such a light guiding device 11 is shown in FIG. 3. Preferably, the light guide sends out light over its complete length.

Figure 3A:
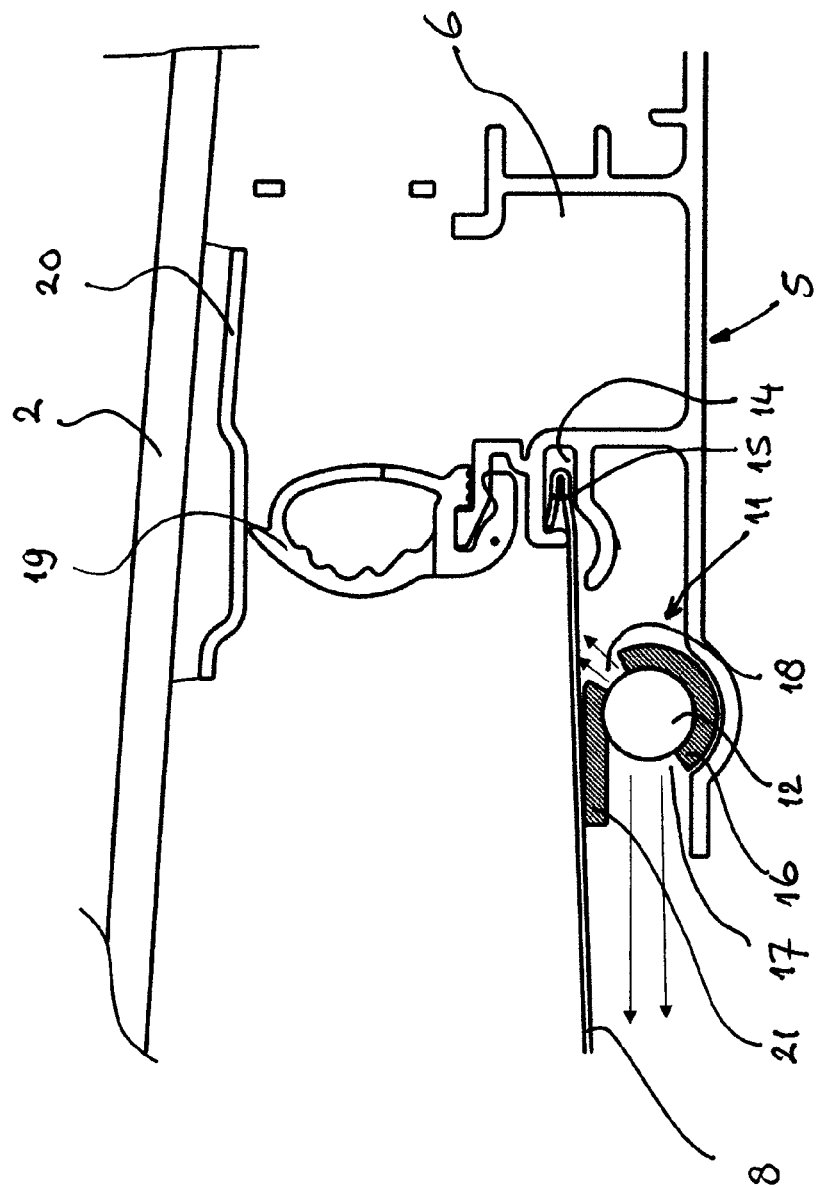
FIG. 3a, b are schematic cross sections of the guide rail and of an embodiment of the light guiding device along line III-XI to III-XI in FIG. 2, illustrating a closed (FIG. 3a) and open (FIG. 3b) position of the sunscreen.

In FIGS. 3A and 3B a part of guide rail 5 is shown and further showing a part of flexible sunscreen 8 which is kept in a groove 14 of guide rail 5 by means of a folded edge part 15 of flexible sunscreen 8. Adjacent and below sunscreen 8 guide rail 5 is equipped with light guiding device 11. In this embodiment, the upper side of light guiding device 11 is substantially at the same level as the bottom of groove 14. This means that a part of light guiding device 11 can act as a support for sunscreen 8, which will be further elucidated later on.

The light guiding device 11 comprises the first light guide 12 here comprising of a solid transparent core which is able to transmit light that is introduced into the light guide 12 at one or both ends by one or more of said light sources 13 (not shown in FIGS. 3A and 3B). The first light guide 12 extends substantially parallel to the respective guide rail 5, 6 and therefore generally also follows any curvature thereof. In the embodiment shown, the cross-section of the first light guide 11 is circular, however, other cross-sections are conceivable, such as polygonal, e.g. rectangular or square, in which edges could be rounded to avoid bright lines at the sharp edges.

In the first embodiment of FIGS. 3A and 3B, light guide 12 is surrounded by a light blocking (non-transparent) shield 16 having a first window 17 and a second window 18. Light guide 12 is able to direct light through first window 17 towards a central part of sunscreen 8, in particular when this is closed, and to direct light through second window 18 to parts above groove 14 of guide rail 5, a seal 19 mounted on guide rail and a reinforcement 20 below panel 2 cooperating with seal 19 when panel 2 is in its closed position. These parts can only be illuminated if sunscreen is retracted or rolled-up on its winding roller. Windows 17 and 18 will of sufficient lengths to enable illumination of the lengths of panel 2 and sunscreen 8 that are exposed to interior space 9 of the vehicle.

It is shown in FIG. 3A, 3B that shield 16 is equipped with a projecting part 21 projecting towards the center of sunscreen 8 along the complete length of shield 16. The length of projecting part 21 is such that light is blocked in the direction of panel 2 thereby preventing reflection of light by panel 2 when sunscreen 8 is retracted. Due to the height of the upper side of shield 16 and in this case also of its projecting part 21, the shield 16 can be used to support and guide sunscreen 8. The material of shield 16 can be chosen such that it has good sliding properties.

Light guide 12 may e.g. be made of transparent PMMA (Poly methyl methacrylate also known as acrylic, acrylic glass, perspex, or plexiglass), while shield 16 could be made of white colored PMMA with a low light efficiency. The light guide 12 and shield 16 could be made by co-extrusion, but it would be best to have some kind of surface separation to minimize light entering shield 16.

Figure 4:
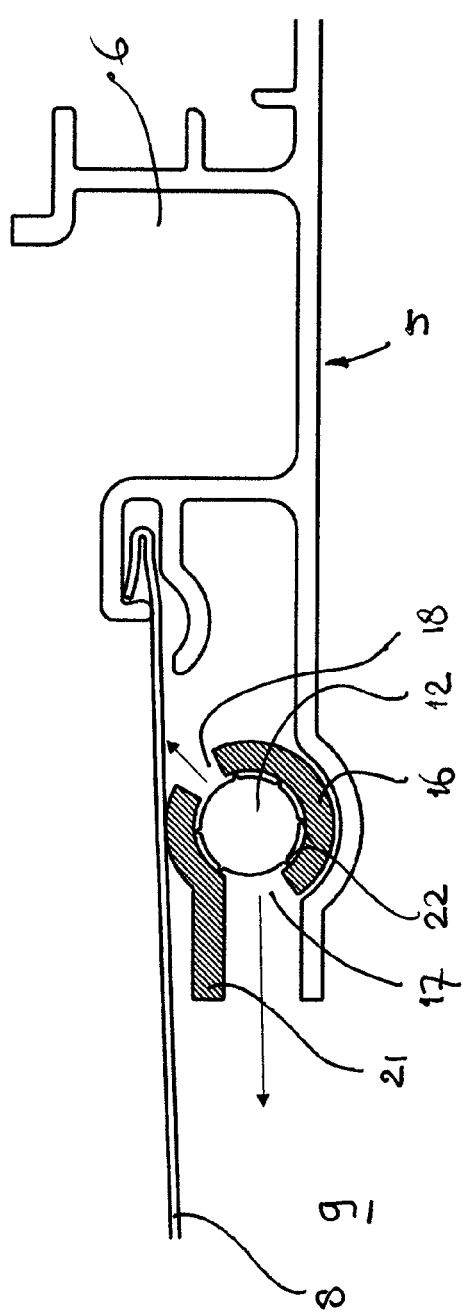

In the embodiment of FIG. 4, the surface separation is accomplished by means of small distance holders 22 on the outer surface of light guide 12.

Figure 5:
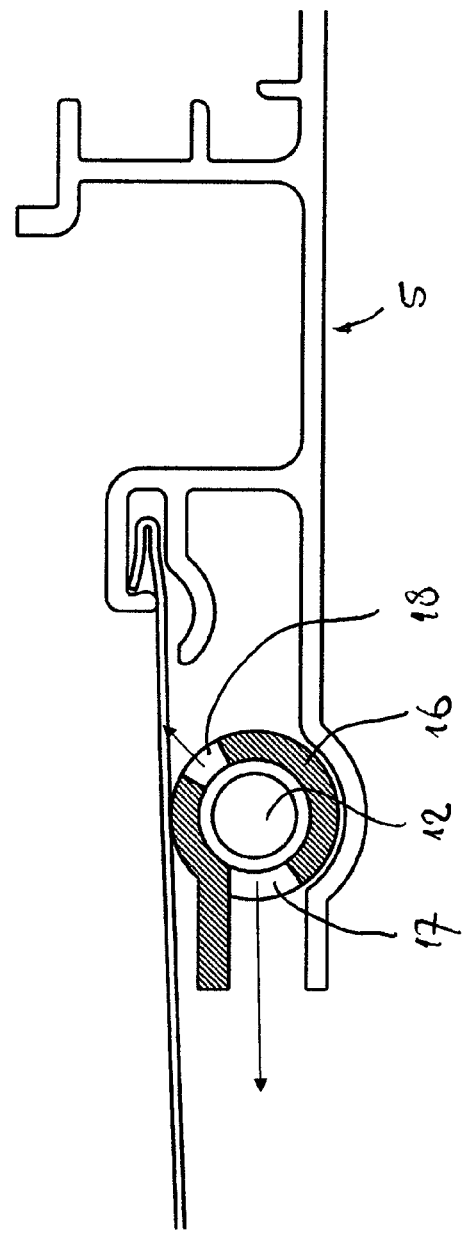

FIG. 5 shows an embodiment where light guide 12 and shield 16 are separate parts. Windows 17, 18 could be transparent parts of shield 16 formed by co-extrusion. However, windows 17 could also be left open, and as a result, light guide 12 could be inserted into shield 16 from the side through window 17, instead of being inserted from an end of shield 16. Shield 16 could then be fixed on light guide 12 by a clamping fitting. Other means of attachment could be welding, gluing etc.

In the FIG. 6A embodiment, light guide 12 is not a solid core, but comprises a plurality of fibres 23A bundled together by means of a cladding 23B. Shield 16 is formed as a separate element.

FIG. 6B shows an embodiment in which cladding and shield are integrated and thus shield 16 as shown also functions as cladding for a light guide 12 comprising a fiber bundle.

FIG. 7A shows another embodiment in which shield 16 is left out and in which light guide 12 is provided on its outer surface with two prisms 24, 25 at a position 180 degrees opposite to the position of windows 17, 18 of the shield 16 in the previous embodiment. Prisms 24, 25 direct the light internally away to the other side, so that the same effect is accomplished as in the former embodiments. The prisms 24, 25 can be formed by or replaced by e.g. a light reflecting print, a rough texture or co-extrusion on the circumference of the first light guide co-extrusion or the like (FIG. 7B).

FIG. 8 shows that the embodiment of FIG. 7A can also be combined with shield 16 precluding any light from leaving light guide 12 at a non-desired position.

The light guiding device 11 in the embodiment of FIGS. 9A and 9B comprises not only first light guide 12 but also a second light guide 26. Second light guide 26 is arranged above the level of sunscreen 8. Light guides 12, 26 both receive light from the same light source 13, for example a LED light source. Of course, the light guides 12, 26 could also receive light from different light sources. The cross-section of the light guide 12 and/or 26 at the position of the light source(s) could be different from that where the interior is illuminated. Also in the latter position, the cross section could vary along the length.

Each light guide 12, 26 illuminates its own area, in this case first light guide 12 illuminates the lower side of sunscreen 8 and second light guide 26 the area between sunscreen 8 (or groove 14 of guide rail 5) and panel 2. For this purpose, light guide 26 has a projecting part 27 protruding in a substantially vertical direction. Thus, light guide 26 emits light from this area instead of illuminating this area and thus indirectly emitting light therefrom. This latter would also be possible of course. Such a vertical projecting part 27 may also have a function as a cover which protects against objects being trapped by a slidable mechanism for opening and closing one or both of the first and second panels 2, 2'. The vertical projection 27 is covered by a shield 16' at its side facing outer part 6 of guide rail 5, said shield 16' thereby forming a part of the cover.

Figure 10:
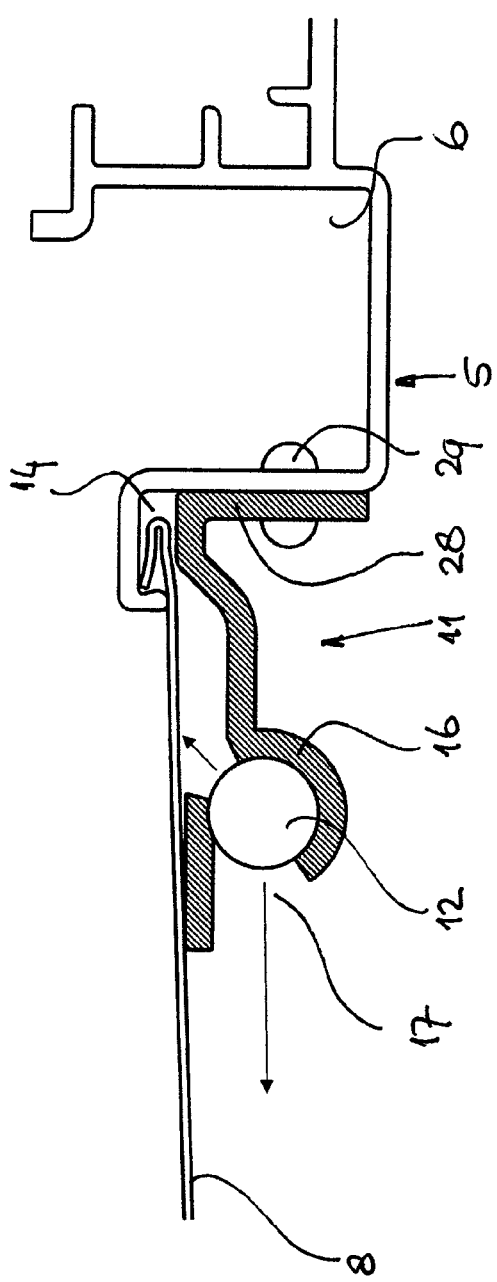
Figure 11:
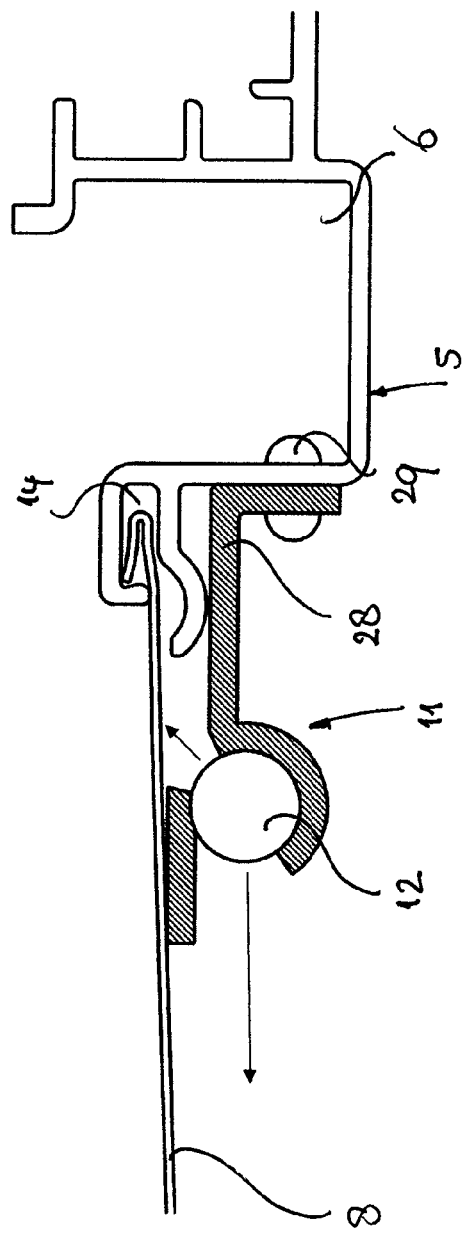

FIGS. 10 and 11 show two embodiments in which light guiding device 11, and in this case shield 16 thereof is integrated in guide rail 6 and also performs an additional function already mentioned above. This additional function is to support and guide sunscreen 8 from below without resting on a part of guide rail 5. For this purpose, shield 16 is provided with an attachment portion 28 with which shield 16 is attached to an (upright) wall of guide rail 6, e.g. by means of a rivet 29 or by any other suitable means, such as screwing, gluing, welding etc. In the embodiment of FIG. 10 shield 16 also forms a lower wall of groove 14 for folded edge part 15 of sunscreen 8.

The invention is not limited to the embodiments described before which may be varied widely within the scope of the invention as defined by the appending claims. For example a diffuser could be positioned in front of the light guide (or integrated into it) in order to smoothen the light image.

What is claimed is:

1. An open roof construction for a vehicle, comprising at least one at least semi-transparent panel for closing an opening in a fixed roof of the vehicle, a retractable sunscreen device capable of blocking daylight to an interior space below the sunscreen entering through the panel when extended and allowing the daylight to pass to the interior space of the vehicle when retracted, said sunscreen device including a sunscreen slidably guided in a pair of guide rails each extending below and along a longitudinal edge of the opening in the fixed roof in a longitudinal direction, a light guiding device attached to each of the guide rails such that the light guiding devices are closer to each other transversely across the opening than inner sides of the pair of guide rails, said light guiding device comprising at least a first light guide for guiding light from a light source to the interior space in the vehicle, wherein said light guiding device on each of the guide rails is configured to emit light at least in two different directions, one direction being towards a central part of the sunscreen, the other direction being directly towards or directly from an area between the respective guide rail and the panel.

2. The open roof construction according to claim 1, wherein the first light guide is configured to emit light in said two different directions.

3. The open roof construction according to claim 2, and further comprising a non-transparent shield partly surrounding the first light guide.

4. The open roof construction according to claim 3, wherein the shield includes transparent windows at positions to emit light in said two different directions.

5. The open roof construction according to claim 4, wherein at least one of the windows of the shield is open.

6. The open roof construction according to claim 5, wherein the shield is co-extruded with the first light guide.

7. The open roof construction according to claim 3, wherein the shield is a part clamped around the first light guide.

8. The open roof construction according to claim 1, wherein said light guiding device comprises light directing members on an outer circumference of the first light guide directing light out of the first light guide at a position opposite to the light directing members.

9. The open roof construction for a vehicle according to claim 4, wherein the shield of each light guiding device includes a projecting part above the window directing light towards a central part of the sunscreen.

10. The open roof construction according to claim 1, wherein the light guiding device includes a second light guide emitting light to an upright cover covering at least a part of an area between the respective guide rail and the panel, and wherein the second light guide is arranged at a level above the sunscreen.

11. The open roof construction according to claim 10 and wherein the second light guide is arranged at a level above the sunscreen.

12. The open roof construction according to claim 3, wherein the shield includes an attachment to attach the shield to the guide rail.

13. The open roof construction according to claim 12, wherein a part of the shield forms a sliding surface for the sunscreen.

14. The open roof construction for a vehicle according to claim 13, wherein the part forms a bottom of a guide groove for guiding a lateral side edge of the sunscreen.

15. The open roof construction for a vehicle according to claim 14, wherein the first or second light guide is either a solid core or a bundle of light guiding fibres surrounded by a cladding.

16. The open roof construction according to claim 1, wherein the light guiding device sends out light along substantially its complete length so as to illuminate the sunscreen and the panel along a length that is exposed to the interior space of the vehicle.

17. The open roof construction for a vehicle according to claim 1, wherein the first light guide is a solid core.

18. The open roof construction for a vehicle according to claim 1, wherein the first light guide is a bundle of light guiding fibers surrounded by a cladding.

19. An open roof construction for a vehicle, comprising at least one at least semi-transparent panel for closing an opening in a fixed roof of the vehicle, a retractable sunscreen device capable of blocking daylight entering through the panel when extended and allowing the daylight to pass to an interior space of the vehicle when retracted, said sunscreen device including a sunscreen slidably guided in a pair of guide rails each extending below and along a longitudinal edge of the opening in the fixed roof in a longitudinal direction, a light guiding device attached to each of the guide rails, said light guiding device comprising a first light guide the first light guide is configured to emit light in said two different directions, one direction being towards a central part of the sunscreen, the other direction being towards an area between the respective guide rail and the panel, wherein a non-transparent shield partly surrounds the first light guide, and wherein the shield includes windows at the positions to emit light in said two different directions.

20. An open roof construction for a vehicle, comprising at least one at least semi-transparent panel for closing an opening in a fixed roof of the vehicle, a retractable sunscreen device capable of blocking daylight entering through the panel when extended and allowing the daylight to pass to an interior space of the vehicle when retracted, said sunscreen device including a sunscreen slidably guided in a pair of guide rails each extending below and along a longitudinal edge of the opening in the fixed roof in a longitudinal direction, a light guiding device attached to each of the guide rails, said light guiding device comprising a first light guide for guiding light from a light source to the interior space in the vehicle and a second light guide emitting light to or from an upright cover covering at least a part of an area between the respective guide rail and the panel, and wherein the second light guide is arranged at a level above the sunscreen.

* * * * *